United States Patent [19]

Harrold et al.

[11] Patent Number: 5,066,891
[45] Date of Patent: Nov. 19, 1991

[54] MAGNETIC FIELD CANCELLATION CIRCUIT

[75] Inventors: William J. Harrold, Derry, N.H.; Joseph A. Sansone, Rehoboth, Mass.; Joseph W. Bonfiglio, West Newton, Mass.; Seung K. Kim, Shrewsbury, Mass.

[73] Assignee: Raytheon Company, Lexington, Mass.

[21] Appl. No.: 459,867

[22] Filed: Jan. 2, 1990

[51] Int. Cl.$^5$ .............................................. H01J 29/06
[52] U.S. Cl. ......................................... 315/8; 335/284
[58] Field of Search .................... 315/8, 370; 335/284; 361/150; 307/91

[56] References Cited

U.S. PATENT DOCUMENTS 4,963,789 10/1990 Buhler ...................................... 315/8

OTHER PUBLICATIONS

Analysis of the Ring-Core Magnetometer, S. V. Marshall, IEEE Transactions on Magnetics, Sep. 1967, pp. 459-463.
Recent Advances in Fluxgate Magnetometry, D. I. Gordon and R. E. Brown, IEEE Transactions on Magnetics, Mar. 1972, pp. 76-82.

Primary Examiner—Eugene R. LaRoche
Assistant Examiner—Ali Neyzari
Attorney, Agent, or Firm—Christopher L. Maginniss; Richard M. Sharkansky

[57] ABSTRACT

A magnetic field sensing and canceling circuit for use with a cathode ray tube (CRT) has a closed loop system consisting of flux gate sensors to measure external magnetic fields and magnetic field cancellation coils around the perimeter of the faceplate of the CRT to cancel the fields and thus minimize color and positional ac image distortion. The coils are mounted on an enclosure fabricated of a high permeability material and are positioned around the perimeter of the CRT's faceplate. Four of the coils are parallel to the top, bottom, and sides of the enclosure opening and a fifth coil is wound around the enclosure adjacent the CRT faceplate. The magnetic flux gate sensors provide output signals that are functions of the detected fields. These signals control the current in the magetic field cancellation coils and thus control the cancellation fields.

20 Claims, 6 Drawing Sheets

MAGNETIC FIELD CANCELLATION CIRCUIT

BACKGROUND OF THE INVENTION

This invention relates generally to the detection and generation of magnetic fields and, more particularly, to an apparatus for reducing the effect of an external magnetic field within a partially open shielding structure by the generation of compensating magnetic fields in the vicinity of the opening.

Many types of electronics equipment are deleteriously affected by the presence of external magnetic fields which are significantly greater than the earth's field. One example of such equipment, and the particular one to which the present invention is directed, is a color monitor having a shadow mask cathode ray tube (CRT) as the display element. A magnetic field has two major effects on the performance of a color CRT display: (1) it shifts the entire electron beam raster vertically or horizontally, or a combination of both, and (2) it causes the displayed colors to change as the beam is deflected away from its intended phosphors to ones of a different color.

There are situations, especially in tactical environments, where external magnetic fields of up to five gauss (approximately ten times the magnetic field generated by the earth) may be expected. In such environments, it is generally required that the presence of such a field will not deleteriously affect performance of the resident electronic equipment. Furthermore, it is also expected that the equipment will operate unaffected by magnetic fields within this range which are time-variable at a rate of up to 20 gauss per second.

While the effect of these magnetic field conditions has only a negligible impact on the overall position of the electron beam raster on a CRT faceplate, it has a very significant impact on the color display performance and, indeed, if color information in a video transmission is of operational significance, such information may be displayed erroneously or, at best, ambiguously. It is therefore of great importance that the CRT in a color monitor be protected from the effects of external magnetic fields, and, in particular, time-varying magnetic fields.

A commonly-used practice for protecting electronic equipment from the effects of an external magnetic field is to enclose the apparatus within a shield fabricated of a high permeability material. The shield serves to attract the magnetic flux lines toward itself, and provides a magnetically-conductive path, directing the flux around and away from the apparatus inside the shield. However, it is easily recognized that a CRT cannot be totally enclosed within a shield structure; clearly, there cannot be a magnetic shield in front of the CRT faceplate. Locating the CRT within an open shielding structure will reduce the effects of a magnetic field, especially if the field has significant components perpendicular to the main axis of the tube, i.e., the axis extending through the center of the faceplate and the gun at the rear of the neck. However, since shielding cannot be placed across the faceplate, the monitor must be placed in an active enclosure which is able to counteract magnetic fields having significant components parallel to the main axis of the CRT.

The beneficial effects of shielding are enhanced, even for substantially axial magnetic fields, by recessing the CRT deeply within a shielded enclosure. However, this practice reduces the angle from which the monitor may be viewed. Furthermore, the additional space needed by an enclosure which would provide an adequate recess for the CRT may not be available, and space considerations may dictate that the CRT be positioned such that its faceplate is positioned in proximity to the opening in the shielding enclosure.

It is therefore necessary to provide a means for reducing the effects of an external magnetic field in the vicinity of the opening of a partially open magnetic shielding structure. It is also necessary to provide such magnetic field reducing means which is efficacious in response to a time-varying external magnetic field.

SUMMARY OF THE INVENTION

It is therefore a primary object of the present invention to provide an apparatus for reducing the effect of an external magnetic field.

It is another object of the present invention to provide a partially open magnetic shielding enclosure, further including means for actively reducing the effect of an external magnetic field in the vicinity of the opening of the enclosure.

It is a still further object of the present invention to provide an enclosure for a color monitor having a cathode ray tube (CRT) as the display element, the enclosure providing magnetic shielding for the CRT, and further including means for actively reducing the effect of an external magnetic field in the vicinity of the CRT faceplate at the opening of the enclosure.

In accordance with the principles of the present invention, an apparatus is disclosed for controlling the total magnetic field in the vicinity of a substantially plane opening of a partially open magnetic shield to a predetermined level. The apparatus comprises a plurality of coil means disposed on the shield, the plurality of coil means including first coil means disposed adjacent the shield opening and second coil means disposed on the shield surrounding the opening, the plurality of coil means for generating a magnetic field in the vicinity of the opening. The apparatus further includes means for sensing magnetic field intensity in the vicinity of the shield opening and means responsive to the sensing means for applying currents selectively to the plurality of coil means and for controlling the total magnetic field in the vicinity of the shield opening to the predetermined level.

Further in accordance with the present invention, there is disclosed a combination of a display device including a cathode ray tube, an enclosure for housing the display device, the enclosure being fabricated of a high permeability material and having an opening adjacent the faceplate of the cathode ray tube, and means for reducing an external magnetic field at the cathode ray tube to a predetermined level. The reducing means comprises a plurality of coil means disposed on the enclosure, the plurality of coil means including first coil means disposed adjacent the enclosure opening and second coil means disposed on the enclosure surrounding the opening, the plurality of coil means for generating a magnetic field in the vicinity of the opening. The reducing means further includes means for sensing magnetic field intensity in the vicinity of the enclosure opening and means responsive to the sensing means for applying currents selectively to the plurality of coil means and for controlling the total magnetic field in the vicinity of the cathode ray tube to the predetermined level.

With such arrangement, the magnetic field strengths at predetermined positions in the vicinity of the faceplate of the CRT are measured, the measurement data are processed and currents generated to energize magnetic field cancellation coils affixed to the enclosure to thereby produce compensating fields, such that the net magnetic field at the CRT is either entirely canceled or is set to some predetermined small value.

BRIEF DESCRIPTION OF THE DRAWINGS

Other features and advantages of the present invention will be more fully understood from the following detailed description of the preferred embodiment, the appended claims, and the accompanying drawings, in which:

DESCRIPTION OF THE PREFERRED EMBODIMENT

Figure 1:
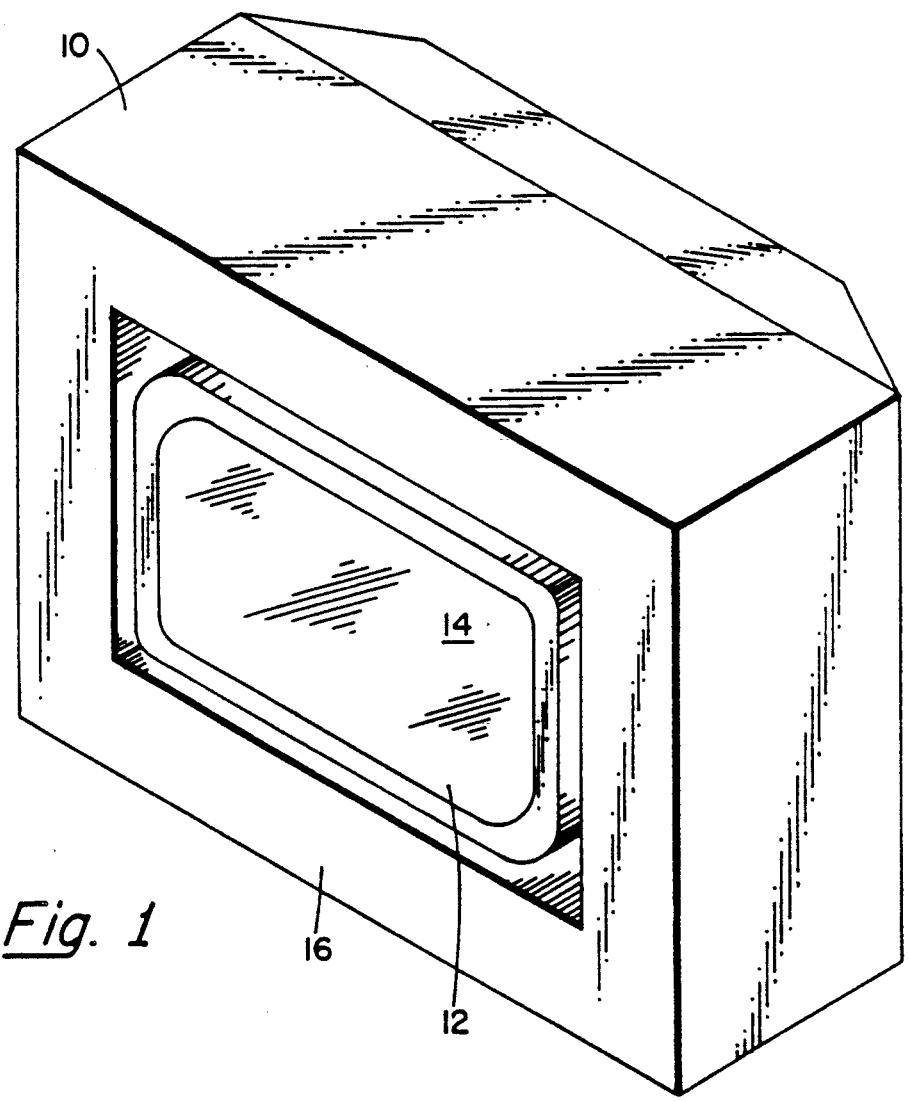
FIG. 1 illustrates a magnetic shield enclosure for use with a cathode ray tube.

Referring to FIG. 1, there is shown an open enclosure 10, fabricated of a high permeability material, having a cathode ray tube (CRT) 12 within enclosure 10 such that its faceplate 14 is substantially aligned with the opening of enclosure 10. Cathode ray tube 12 may be part of a color monitor, the electronics circuits of which may be located remotely. Enclosure 10 includes flange portions 16 around the opening which substantially frame the faceplate 14 of CRT 12. The material of enclosure 10 typically has a relative permeability greater than 20,000.

Figure 2:
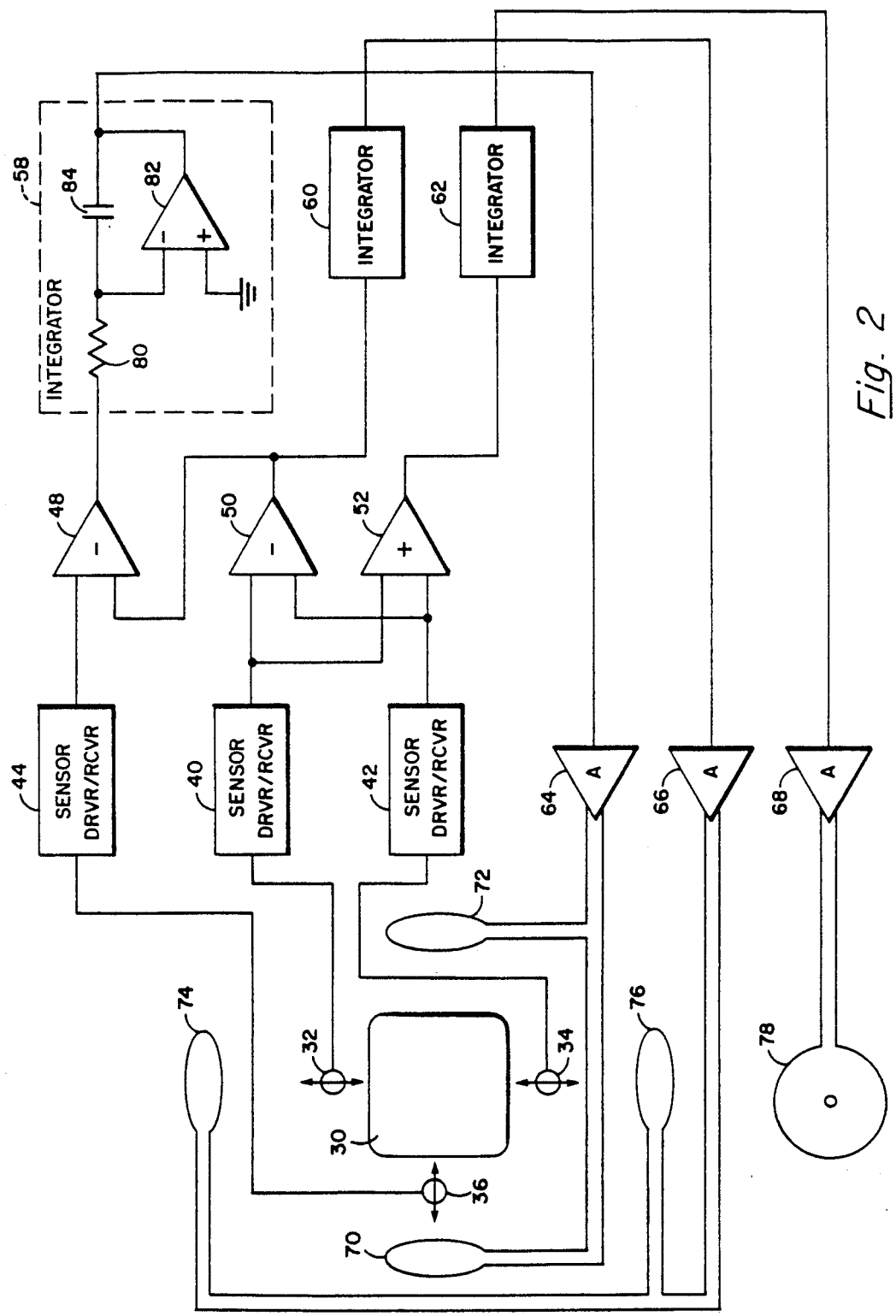
FIG. 2 is a simplified system block diagram of a magnetic field reduction apparatus according to the present invention.

Referring now to FIG. 2, there is shown, in simplified block diagram form, the magnetic field cancellation system according to the present invention. The system includes magnetic sensors 32, 34 and 36 positioned around the faceplate of a cathode ray tube 30. Sensors 32, 34 and 36 are individually coupled, respectively, to driver/receivers 40, 42 and 44 whose outputs are applied to algebraic combiners 48, 50 and 52 so as to perform pre-selected functions. Integrators 58, 60 and 62 are coupled between combiners 48, 50 and 52, and coil drivers 64, 66 and 68. Drivers 64, 66 and 68 provide currents, respectively, to magnetic field cancellation coils 70, 72, 74, 76 and 78 to generate compensating magnetic fields in the vicinity of the faceplate of cathode ray tube 30. Thus, it will be seen that the magnetic field cancellation system of FIG. 2 comprises a closed-loop system which may be configured to maintain a net magnetic field in the vicinity of cathode ray tube 30 at a predetermined small value, preferably at a null.

Magnetic sensors 32, 34 and 36 are positioned around the periphery of the faceplate of cathode ray tube (CRT) 30. Sensors 32, 34 and 36 are sensitive to magnetic fields along axes which are perpendicular to the magnetic shielding enclosure (not shown) surrounding the faceplate of CRT 30. In the present invention, the preferred form of magnetic field sensor is a flux gate, which is described in detail in relation to FIGS. 4a through 4e. Alternatively, sensors 32, 34 and 36 may be Hall effect devices, which are well known in the art, or any of many other magnetic field sensors.

The output signals from sensors 32, 34 and 36 are coupled, respectively, to driver/receiver circuits 40, 42 and 44, which measure the magnetic field sensed by the corresponding sensors and which couple back appropriate dc levels to the sensors. In a preferred embodiment, driver/receiver circuits 40, 42 and 44 may all be substantially identical. A more detailed description of a sensor driver/receiver circuit and of its operation with a flux gate sensor, is provided in a subsequent paragraph in relation to FIG. 5.

The output signals from driver/receiver circuit 40, responsive to sensor 32 positioned on the enclosure (not shown) adjacent the top of the faceplate of CRT 30, and from driver/receiver circuit 42, responsive to sensor 34 positioned adjacent the bottom of CRT 30, are added by algebraic summing circuit 52. The output signals from driver/receiver circuits 40 and 42 are applied to algebraic subtracting circuit 50 which determines the vector difference between the signals derived from sensors 32 and 34, positioned, respectively, on the enclosure (not shown) adjacent the top and bottom of the faceplate of CRT 30. The output signal from driver/receiver circuit 44, responsive to sensor 36, positioned on the enclosure (not shown) adjacent the left side of the faceplate of CRT 30, and the output signal from algebraic subtracting circuit 50, are applied to algebraic subtracting circuit 48 which determines the vector difference between these two signals. In a preferred embodiment, algebraic subtracting circuits 48 and 50 may be substantially identical.

It should be noted that the configuration and functions shown for algebraic combiners 48, 50 and 52 are selected in accordance with one embodiment tailored to the specific positioning of sensors 32, 34 and 36 as shown herein. This particular configuration obviates the need for a fourth magnetic sensor, which one might assume would be needed adjacent the right side of the faceplate of CRT 30. Other configurations, from which the components of an external magnetic field may be determined, are deemed to be included within the basic inventive concepts of the present disclosure. Furthermore, considerations of symmetry will reveal that two sensors mounted on the enclosure (not shown) on both sides of CRT 30, and a third sensor mounted on the enclosure (not shown) either above or below CRT 30, will provide comparable field intensity information to that provided by the disclosed embodiment.

The output signals from algebraic subtracting circuits 48 and 50 and algebraic summing circuit 52 are applied, respectively, to integrators 58, 60 and 62, for providing a ramp signal in response to the substantially dc signal output from the corresponding summing circuit. Some degree of detail is shown in this FIGURE for integrator 58; it will be understood that integrators 60 and 62 may be substantially identical to integrator 58, which, in the present embodiment, includes resistor 80, differential amplifier 82 and capacitor 84. It will be recognized that digital integrators, well known in the art, may be substituted for integrators 58, 60 and 62. As is well known, the ramp time constant of integrator 58 is the product of its resistance value (in ohms) and its capacitance value (in farads).

The output signals from integrators 58, 60 and 62 are applied, respectively, to coil drivers 64, 66 and 68, which, in the present example, comprise transconductance amplifiers, whose output current is proportional to the applied input voltage. Coil driver 64 drives a coil consisting of a first winding 70 positioned at one side of the faceplate of CRT 30 in series with a second winding 72 positioned at the other side of the faceplate of CRT 30. Coil driver 66 drives a coil consisting of a third winding 74 positioned above the faceplate of CRT 30 in series with a fourth winding 76 positioned below the faceplate of CRT 30. Coil driver 68 drives a coil consisting of a fifth winding 78 wrapped around the enclosure shield (not shown) thereby substantially encircling of the faceplate of CRT 30.

Coils 70, 72, 74 and 76 perform two functions: first, they redirect the greater portion of the external magnetic field lines of flux by shunting them into the high permeability material of the enclosure (not shown), thereby preventing them from entering the shield volume; and second, they generate a compensating field which counteracts the external field entering the enclosure. Coils 70, 72, 74 and 76 are effective in compensating for components of the external magnetic field which are perpendicular to the main axis of CRT 30. Coil 78 is effective in compensating for the axial component of the magnetic field, i.e., that component which is parallel to the main axis of CRT 30, by generating a counteracting magnetic field around the enclosure (not shown). In the present example, coil drivers 64, 66 and 68 and magnetic field cancellation coil windings 70, 72, 74, 76 and 78 are selected such that driver currents of 1.0 ampere are sufficient to compensate for an external magnetic field of 5 gauss.

Figure 3:
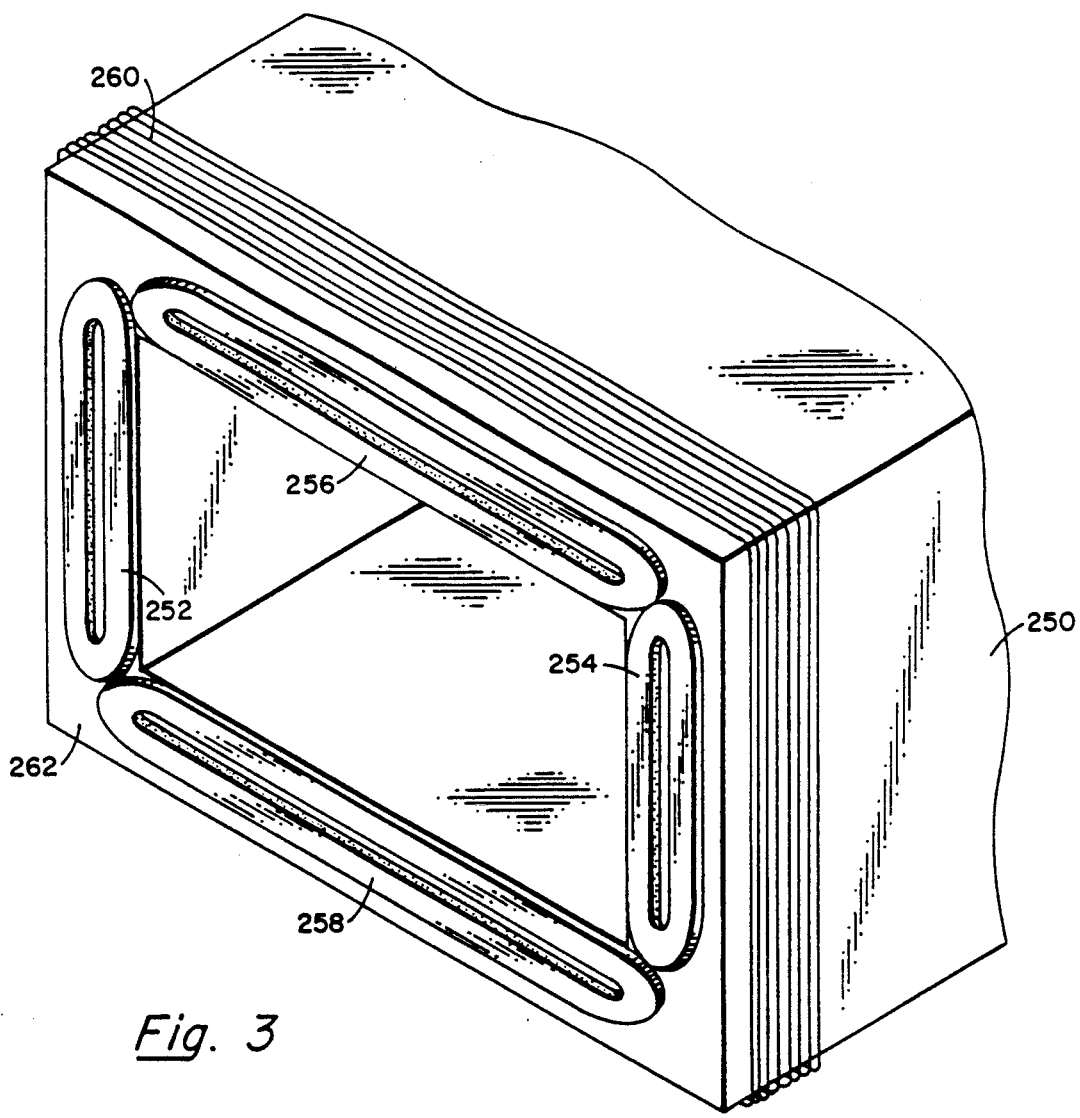
FIG. 3 illustrates the relative placement of degaussing coils according to a preferred embodiment of the system of FIG. 2 for use in an enclosure of the type illustrated in FIG. 1.

Referring to FIG. 3, there is shown a view of the front portion of an enclosure 250 which may be similar to high permeability enclosure 10 of FIG. 1. The view of FIG. 3 includes magnetic field cancellation coils 252, 254, 256, 258 and 260 which may be of a type represented, respectively, as coils 70, 72, 74, 76 and 78 and discussed in an earlier paragraph in relation to FIG. 2. Although there is no attempt at representing the elements of FIG. 3 to accurate scale, the following paragraphs will provide approximate dimensional information describing the preferred embodiment built and tested by the applicants.

Enclosure 250 is fabricated of a high nickel steel alloy having a sheet thickness of 0.060 in. (1.5 mm). The overall height of enclosure 250 is 15.5 in. (39.4 cm) and its width is 18.5 in. (47.0 cm). Flanged surface 262 at the front of enclosure 250, which supports coils 252, 254, 256 and 258, is 2.0 in. (5.1 cm) in width, resulting in a rectangular opening in enclosure 250 which is 11.5 in. high and 14.5 in. (29.2 cm by 36.8 cm) in width.

In this embodiment, coils 252, 254, 256 and 258 each comprise 200 turns of #23 AWG copper wire formed into loops approximately 1.75 in. (4.44 cm) in width and approximately 0.25 in. (0.635 cm) in height. The overall length of the loops of coils 252 and 254 is approximately 12.5 in. (31.8 cm); the overall length of the loops of coils 256 and 258 is approximately 15.5 in. (39.4 cm). Coils 252, 254, 256 and 258 are fabricated according to conventional methods; in the present embodiment they are wound about forms and impregnated using a suitable compound such as varnish. These preformed coils are affixed to enclosure 250 using suitable attachment means, such as double-sided tape (not shown) or enclosure-mounted brackets (not shown). In the present example, coils 252, 254, 256 and 258 are attached to enclosure 250 such that each of their inner surfaces is essentially flush with the inner edge of the corresponding portion of flanged surface 262.

Coil 260 comprises 200 turns of #23 AWG copper wire which is wound around the outside surface of enclosure 250 as seen in FIG. 3. In the preferred embodiment, coil 260 is wound as a first layer of 100 turns covered by a second layer of 100 turns. The coil is positioned approximately 0.5 in. (1.3 cm) from the front surface of enclosure 250 and has a width of approximately 2.0 in. (5.1 cm).

The only limitations on the directions of the windings of the coils on enclosure 250 are as follows: coils 252 and 254 must be oppositely polarized, and coils 256 and 258 must also be oppositely polorized. All other current directivities may be configured by the current drivers, as may be recognized in subsequent discussions.

Figure 4C:
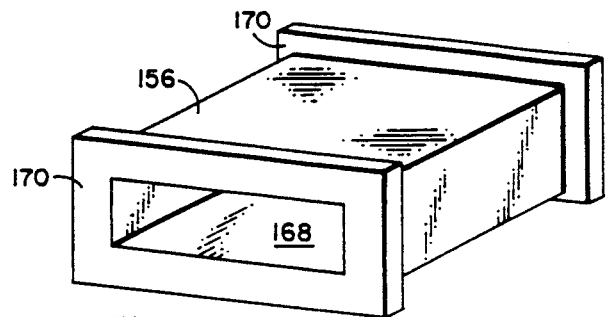
FIGS. 4a through 4e illustrate a flux gate sensor of a type for use in the apparatus of FIG. 2.

Referring to FIGS. 4a through 4d, there are shown components of a flux gate sensor 150. FIG. 4e illustrates the complete flux gate sensor 150, which sensor may be of the type shown as magnetic field sensors 32, 34 and 36 of FIG. 2. Sensor 150 comprises a toroidal core element 152 having an excitation winding 154 and a hollow tubing 156 wound with a sense feedback winding 158.

Figure 4A:
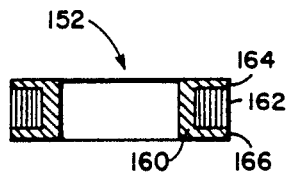
Figure 4D:
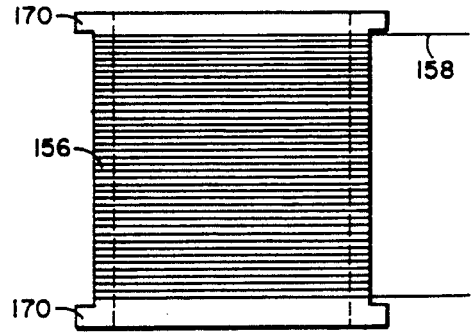

Referring particularly to FIG. 4a, there is shown a bobbin 160, illustratively made of stainless steel. A tape 162 of ferromagnetic material is wrapped around the cylinder of bobbin 160 between the upper and lower rims 164, 166. In the present example, tape 162 comprises twenty turns of Square Permalloy 80 (80% nickel, 20% iron), of thickness 125 microinches. Toroidal core element 152 comprising bobbin 160 and tape 162, as described herein, is sold by Magnetics Component Division of Spang & Co., Butler, PA, as part number 80513-1/8D-0020-01. This core element 152 has an outside diameter of 0.44 inch (11.1 mm), an inside diameter of 0.344 inch (8.73 mm) and a height of 0.10 inch (2.54 mm).

Figure 4B:
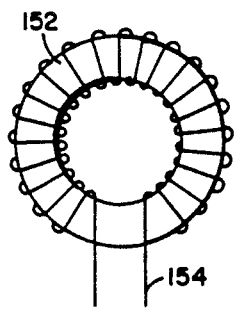
Figure 4E:
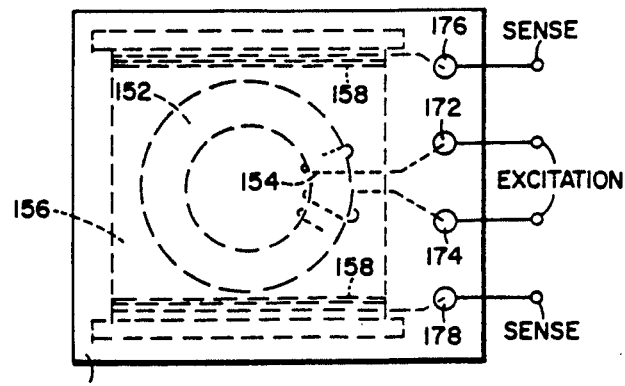

FIG. 4b illustrates toroidal core element 152 of FIG. 4a including an excitation winding 154 therearound. In the present example, winding 154 is a single coil comprising 139 turns of Manganin-230 wire, an alloy comprising 87% copper and 13% manganese, having diameter corresponding to #34 A.W.G.

FIG. 4c is an isometric view illustrating a tubing 156 having a generally rectangular cross-sectional aspect. A rectangular cavity 168 through tubing 156 is suitable for the insertion therein of toroidal core element 152. Tubing 156 includes flanges 170 at either end, and is preferably fabricated of glass-epoxy.

FIG. 4d is a top view of tubing 156 having a sense/feedback winding 158 around the body between flanges 170. In the present example, winding 158 is a single coil comprising 585 turns of Manganin-230 wire.

FIG. 4e illustrates an assembled flux gate sensor 150 depicting toroidal core element 152 and glass-epoxy tubing 156 in phantom view. Flux gate sensor 150 includes four external terminal posts 172, 174, 176 and 178. Excitation winding 154, formed about toroidal core element 152, is terminated at posts 172 and 174. Sense/feedback winding 158, formed around glass-epoxy tubing 156, is terminated at posts 176 and 178.

Figure 5:
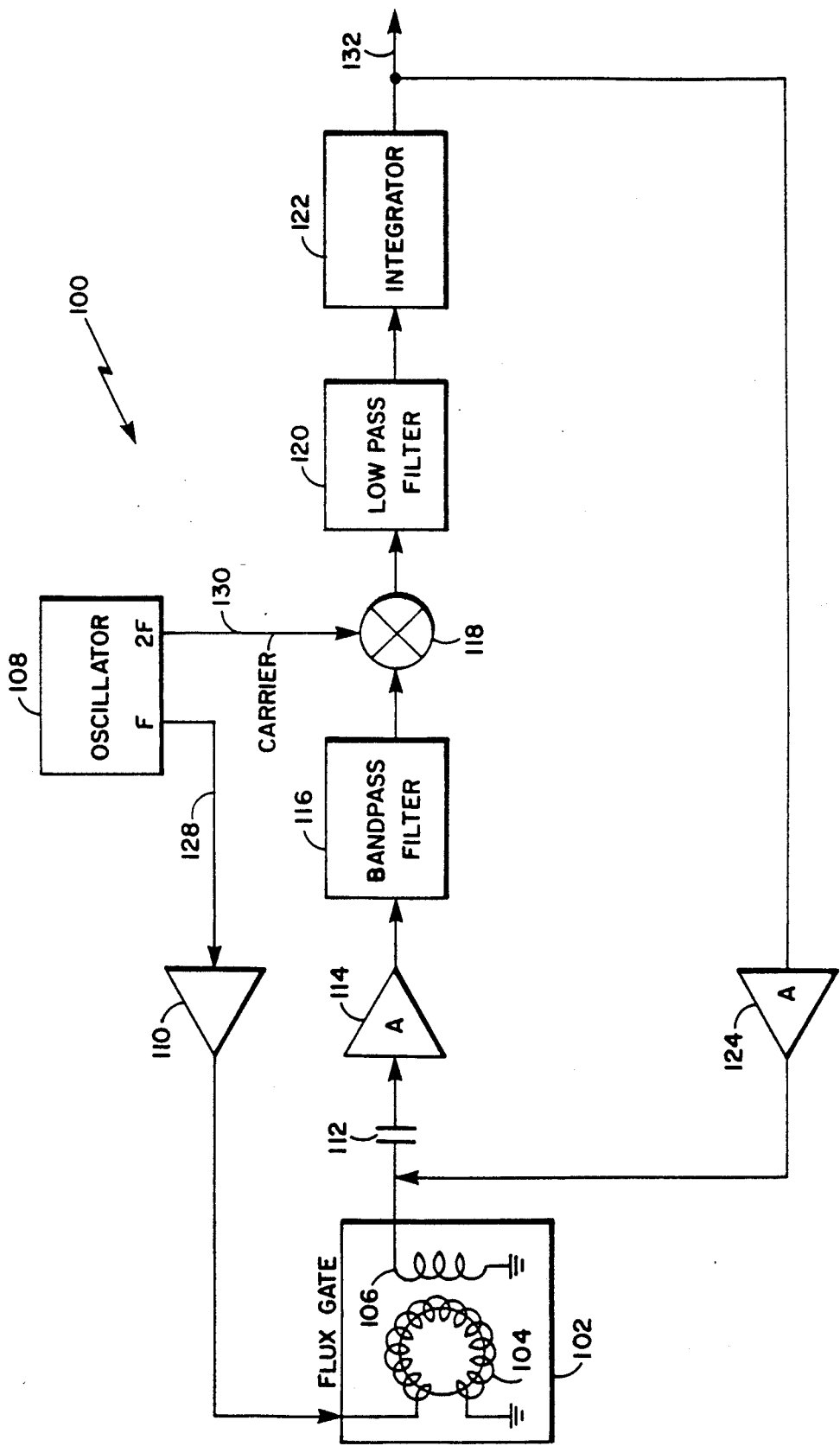
FIG. 5 is a detailed block diagram of the sensor receiver/coil driver circuits for use in the apparatus of FIG. 2.

Referring now to FIG. 5, there is shown a detailed block diagram of the driver and receiver circuit 100 for use with a flux gate sensor. The flux gate sensor 102 shown in FIG. 5 is preferably of a type similar to the sensor described earlier in relation to FIG. 4e. Flux gate sensor 102 includes a toroidally-wound excitation coil 104 and a sense/feedback coil 106.

In the present example, oscillator 108 generates fifty percent duty-cycle square wave signals at two output ports. A first port, styled "F", applies a square wave signal of frequency 28.8 kHz on signal lead 128. A second port, styled "2F", applies a square wave signal of frequency 57.6 kHz on signal lead 130. The signal on lead 128 is applied to coil driver 110, which, in the present example, supplies a peak current output of ±40 milliamperes from a dc offset voltage of less than 0.1 millivolt. The current from driver 110 is supplied as excitation current to the toroidally-wound coil 104 of flux gate sensor 102.

The ac portion of the sense/feedback coil 105 of flux gate 102 is coupled through dc-blocking capacitor 112 to the input of amplifier 114, typically having a gain of 100 (±40 dB). The output signal from amplifier 114 is applied to the input terminal of bandpass filter 116, which removes all but the second harmonic of the drive signal. In the present example, filter 116 is a third-order Butterworth filter having a Q value of 10 and a center frequency of 57.6 kHz.

The filtered output signal is applied as an input signal to demodulator 118. Oscillator 108 supplies the carrier frequency input signal at 57.6 kHz to demodulator 118 on signal lead 130. Demodulator 118 is a synchronous, quadrature, full-wave rectifier; its output is applied to low-pass filter 120, a first order filter having a cutoff frequency of 100 Hz. The output signal from filter 120 is effectively a dc level; it is coupled to integrator 122, which provides a ramped output signal in response to the dc level from low pass filter 120. Integrator 122 is preferably of a type similar to integrator 58 as shown in FIG. 2, having resistor and capacitor values selected to provide a ramp time constant of 100 milliseconds.

In the present example, integrator 122 provides an output signal on signal lead 123 of 2 volts per gauss of the magnetic field detected by flux gate sensor 102. This signal is also applied as an input to amplifier 124, which is illustratively a transconductance amplifier, in which the output current is proportional to the applied input voltage. The output from amplifier 124 is coupled to sense/feedback coil 106 of flux gate sensor 102, where, as an effectively dc level, it is blocked from amplifier 114 by capacitor 112.

In the operation of the circuitry illustrated in FIG. 5, including sensor 102 and driver/receiver circuit 100, the ferromagnetic core (see FIG. 5a) of flux gate sensor 102 is driven cyclically into saturation by means of a periodic current having an appropriate waveshape in the winding 104 around the core. In the present example, oscillator 108 provides a symmetrical, square wave current of 28.8 kHz through driver 110 into winding 104.

In the absence of an external magnetic field, the voltage induced in the sense winding 106 is symmetrical, that is, it contains only odd harmonics of the fundamental frequency of the driving current. In the presence of an external field, which is typically constant or at a low frequency relative to the excitation current applied to coil 104, and which is generally a very small fraction of the peak value of the excitation field, the voltage in sense winding 106 becomes asymmetrical.

The asymmetrical waveform associated with the presence of an external magnetic field is reflected as substantially a dc value in the output from demodulator 118 due to the phase shift of the signal from winding 106 through capacitor 112, amplifier 114 and filter 116. This substantially dc value is a result of the demodulation of the signal from winding 106 by twice the carrier frequency signal from oscillator 108. The output signal from demodulator 118 passes through filter 120 which removes any spurious pulses.

Figure 6A:
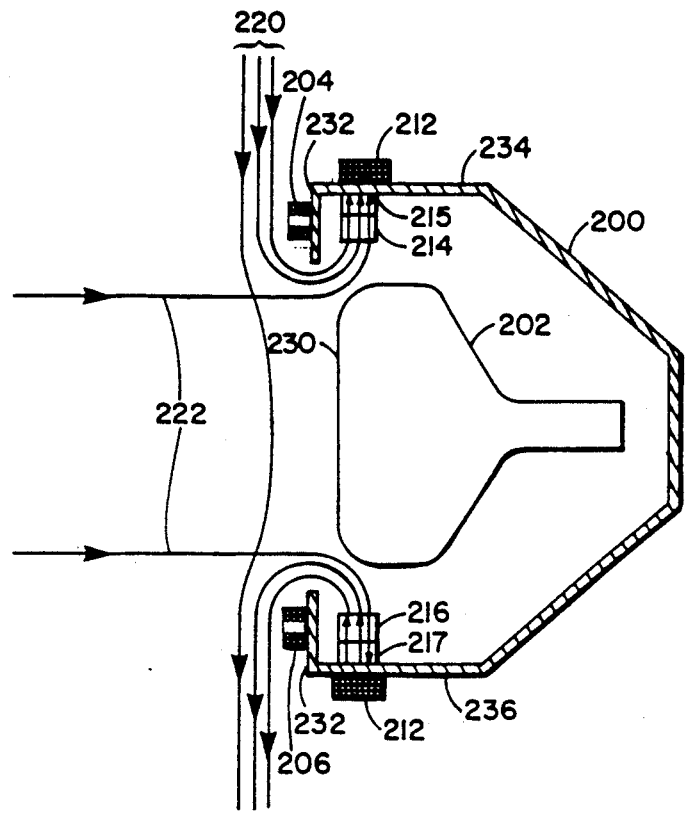
FIGS. 6a and 6b illustrate how the positioning of the sensors is used to measure the magnetic field.
Figure 6B:
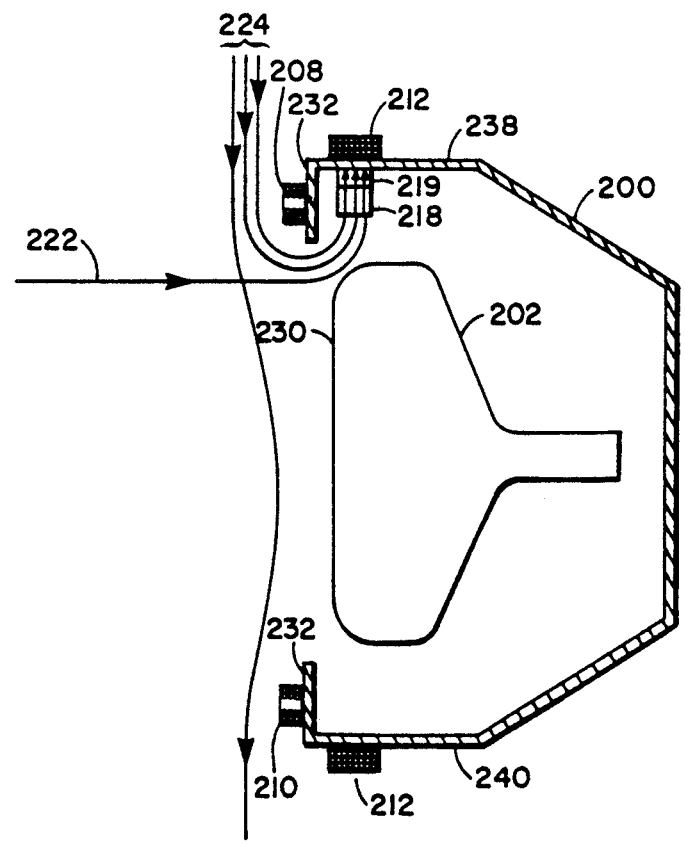

Referring now to FIGS. 6a and 6b, there are shown cross-sectional views of the magnetic field reduction apparatus according to FIG. 2, which views are useful in understanding the field-measuring capability of the sensors. FIG. 6a is a side view of an open enclosure 200 which is subjected to a vertical magnetic field component 220 and an axial magnetic field component 222. FIG. 6b is a top view of open enclosure 200 which is subjected to a horizontal magnetic field component 224 and axial magnetic field component 222. It will be understood that any magnetic field may be evaluated in terms of the magnitudes of its horizontal, vertical and axial components.

FIG. 6a illustrates a cross-sectional side view of an open, high permeability enclosure 200 having therein a cathode ray tube (CRT) 202, such that the faceplate 230 of CRT 202 is substantially aligned with the enclosure opening. Flanged surface 232, extending into the opening, supports horizontally-oriented coils 204 and 206. Coils 204 and 206 are appropriately energized to shunt a portion of the lines of flux from vertical field component 220 into flange 232, and to generate a field which counteracts the vertical field entering enclosure 200. The upper horizontal panel 234 of enclosure 200 and the lower horizontal panel 236 of enclosure 200 support, on their outside surfaces, coil 212 which encircles enclosure 200 adjacent its opening. Coil 212 is appropriately energized to generate a field which counteracts the axial field component 222 entering enclosure 200.

Magnetic sensor 214 is attached to a non-ferromagnetic spacer 215 which is affixed to the inner surface of upper horizontal panel 234; sensor 214 is positioned such that its sensitive axis is perpendicular to the surface of panel 234. Similarly, magnetic sensor 216 is attached to a non-ferromagnetic spacer 217 which is affixed to the inner surface of lower horizontal panel 236; sensor 216 is positioned such that its sensitive axis is perpendicular to the surface of panel 236. In the preferred embodiment, spacers 215 and 217 are selected and positioned such that sensors 214 and 216 are spaced approximately 0.5 in. (1.3 cm) from panels 234 and 236, respectively, and approximately 0.25 in. (0.64 cm) from flanged surface 232.

Enclosure 200, as seen in FIG. 6a, is subjected to the vertical component 220 of a magnetic field, of which some lines of flux are drawn toward the high permeability material of enclosure 200. A portion of the flux lines of magnetic field component 220 pass through the sensitive (vertical) axis of sensor 214, which measures the magnitude of the field. In the example shown in FIG. 6a, the direction of the flux lines through sensor 214 resulting from magnetic field component 220 is upward. The flux lines in enclosure 200 from component 220 are readily conducted through the high permeability material and escape at the lower region; a portion of these flux lines from component 220 pass through the sensitive (vertical) axis of sensor 216, which measures the magnitude of the field. The direction of these escaping flux lines is also upward in this example. Furthermore, assuming a relatively uniform magnetic field in the vicinity of faceplate 230, the amplitudes of the vertical component 220 of the magnetic field measured, respectively, by sensors 214 and 216 will be substantially equal. Thus, it is seen that sensors 214 and 216, responsive to magnetic flux lines entering the top horizontal panel 234 and bottom horizontal panel 236 of enclosure 200, are useful in measuring the vertical component 220 of the magnetic field by recognizing that the sensed fields of this component 220 are equal in amplitude and in the same direction through both sensors 214 and 216.

Enclosure 200, as seen in FIG. 6a, is also subjected to the axial component 222 of the magnetic field, of which some lines of flux are drawn toward the high permeability material of enclosure 200. A portion of the flux lines of magnetic field component 222 pass through the sensitive axes of sensors 214 and 216. In the example shown in FIG. 6a, the direction of flux lines through sensor 214 resulting from magnetic field axial component 222 is upward, and the direction of flux lines through sensor 216 resulting from component 222 is downward. Furthermore, assuming a relatively uniform magnetic field in the vicinity of faceplate 230, the amplitudes of the axial component 222 of the magnetic field measured, respectively, by sensors 214 and 216 will be substantially equal. Thus, it is seen that sensors 214 and 216 are useful in measuring the axial component 222 of the magnetic field by recognizing that the sensed fields of this component 222 are equal in amplitude and in opposite directions through sensors 214 and 216.

FIG. 6b illustrates a cross-sectional top view of enclosure 200. Flanged surface 232 supports vertically-oriented coils 208 and 210. Coils 208 and 210 are appropriately energized to shunt a portion of the lines of flux from horizontal field component 224 into flange 232, and to generate a field which counteracts the horizontal field entering enclosure 200. The left vertical panel 238 and right vertical panel 240 of enclosure 200 support, on their outside surfaces, coil 212. Magnetic sensor 218 is attached to a nonferromagnetic spacer 219 which is affixed to the inner surface of left vertical panel 238; sensor 218 is positioned such that its sensitive axis is perpendicular to the surface of panel 238. In the preferred embodiment, spacer 219 is selected and positioned such that sensor 218 is spaced approximately 0.5 in. (1.3 cm) from panel 238 and approximately 0.25 in. (0.64 cm) from flanged surface 232.

Enclosure 200, as seen in FIG. 6b, is subjected to the horizontal component 224 of the magnetic field, of which some lines of flux are drawn toward the high permeability material of enclosure 200. A portion of the flux lines of magnetic field component 224 pass through the sensitive (horizontal) axis of sensor 218, which measures the magnitude and direction of the field. In the example shown in FIG. 6b, the direction of the flux lines through sensor 218 resulting from magnetic field component 224 is toward the left. The view of enclosure 200 in FIG. 6b also illustrates the flux lines from axial component 222 which are drawn toward enclosure 200, a portion of which pass through the sensitive axis of sensor 218. In this example, the direction of flux lines through sensor 218 resulting from axial component 222 is also toward the left. Because of the assumed uniformity of the overall magnetic field in the vicinity of faceplate 230, it will be recognized that the amplitude of the axial component 222 measured by sensor 218 is substantially equal to the amplitudes measured by sensors 214 and 216, as described in relation to FIG. 6a.

By way of summary in regard to the flux lines measured by sensors 214, 216 and 218, it is seen that for the present example, sensor 214, located above faceplate 230 of CRT 202, measures the sum of the flux lines resulting from the vertical component 220 and the axial component 222. Sensor 216, located below faceplate 230 of CRT 202, measures the difference of the flux lines resulting from the vertical component 220 and the axial component 222. Sensor 218, located to the left of faceplate 230 of CRT 202, measures the sum of the flux lines resulting from the horizontal component 224 and axial component 222.

In general, it may be said that for any combination of flux line direction of the vertical component 220 and axial component 222 of the magnetic field, one of the two sensors located above and below CRT 202 will measure the sum of the components and the other of these two sensors will measure the difference. Further, a sensor located at one side of CRT 202 will measure either the sum or the difference of the horizontal and axial components, which function may be decided from an evaluation of the axial field direction determined from the other two sensors.

From the above it may be seen that the vertical component 220 of the magnetic field may be determined from a vector addition of the outputs of sensors 214 and 216, located, respectively, above and below faceplate 230 of CRT 202. It may also be seen that the axial component 222 of the magnetic field may be determined from a vector difference of the outputs of sensors 214 and 216. Finally, it may be seen that the horizontal component 224 of the magnetic field may be measured from the output of sensor 218, located to the side of faceplate 230 of CRT 202, reduced by the axial component 222 as determined above. These measurements are performed by the configuration of algebraic combiners 48, 50 and 52 as shown in FIG. 2.

While the principles of the present invention have been demonstrated with particular regard to the illustrated structure of the figures, it will be recognized that various departures may be undertaken in the practice of the invention. The scope of this invention is not intended to be limited to the particular structure disclosed herein, but should instead be gauged by the breadth of the claims which follow.

What is claimed is:

1. Apparatus for controlling the total magnetic field in the vicinity of a substantially plane opening of a partially open magnetic shield to a predetermined level, said magnetic shield including a flange portion defining said substantially plane opening, said apparatus comprising:

a plurality of coil means disposed on said shield, said plurality of coil means including first coil means disposed on an external surface of said flange portion adjacent said shield opening, and second coil means disposed on said shield surrounding said opening, said plurality of coil means for generating a magnetic field in the vicinity of said shield opening;

means for sensing magnetic field intensity in the vicinity of said shield opening; and means responsive to said sensing means for applying currents selectively to said plurality of coil means and for controlling the total magnetic field in the vicinity of said shield opening to said predetermined level.

2. The apparatus according to claim 1 wherein said magnetic shield opening comprises a substantially rectangular aperture.

3. The apparatus according to claim 2 wherein said first coil means comprises four windings.

4. The apparatus according to claim 3 wherein each of said four windings disposed on said flange portion is located adjacent a different side of said substantially rectangular aperture.

5. The apparatus according to claim 4 wherein opposite pairs of said four windings are electrically connected in series.

6. The apparatus according to claim 5 wherein said series-connected windings of each of said pairs are oppositely polarized.

7. The apparatus according to claim 1 wherein said sensing means includes three flux gate sensors.

8. The apparatus according to claim 7 wherein said three sensors are mounted within said magnetic shield adjacent three different sides of said shield opening.

9. The apparatus according to claim 8 wherein two of said sensors are mounted on opposite sides of said shield opening, and wherein said applying means includes means for measuring the sum and difference of the magnetic field intensities sensed by said two sensors.

10. In combination:
a display device including a cathode ray tube;
an enclosure for housing said display device, said enclosure fabricated of a high permeability material, said enclosure having an opening adjacent the faceplate of said cathode ray tube, wherein said enclosure includes a flange portion defining said opening; and
means for reducing an external magnetic field at said cathode ray tube to a predetermined level, said reducing means comprising:
a plurality of coil means disposed on said enclosure, said plurality of coil means including first coil means disposed on an external surface of said flange portion adjacent said enclosure opening, and second coil means disposed on said enclosure surrounding said opening, said plurality of coil means for generating a magnetic field in the vicinity of said opening;
means for sensing magnetic field intensity in the vicinity of said enclosure opening; and
means responsive to said sensing means for applying currents selectively to said plurality of coil means and for controlling the total magnetic field in the vicinity of said cathode ray tube to said predetermined level.

11. The combination according to claim 10 wherein said enclosure opening comprises a substantially rectangular aperture.

12. The combination according to claim 11 wherein said first coil means comprises four windings.

13. The combination according to claim 12 wherein each of said first windings disposed on said flange portion is located adjacent a different side of said substantially rectangular aperture.

14. The combination according to claim 13 wherein opposite pairs of said four windings are electrically connected in series.

15. The combination according to claim 14 wherein said series-connected windings of each of said pairs are oppositely polarized.

16. The combination according to claim 10 wherein said sensing means includes three flux gate sensors.

17. The combination according to claim 16 wherein said three sensors are mounted within said enclosure adjacent three different sides of said enclosure opening.

18. The combination according to claim 17 wherein two of said sensors are mounted on opposite sides of said enclosure opening, and wherein said applying means includes means for measuring the sum and difference of the magnetic field intensities sensed by said two sensors.

19. The apparatus according to claim 1 wherein said plurality of coil means are disposed on external surfaces of said magnetic shield.

20. The combination according to claim 10 wherein said plurality of coil means are disposed on external surfaces of said enclosure.

* * * * *